F. FISHER.
FENCE.
APPLICATION FILED NOV. 22, 1912.
1,146,857.  Patented July 20, 1915.
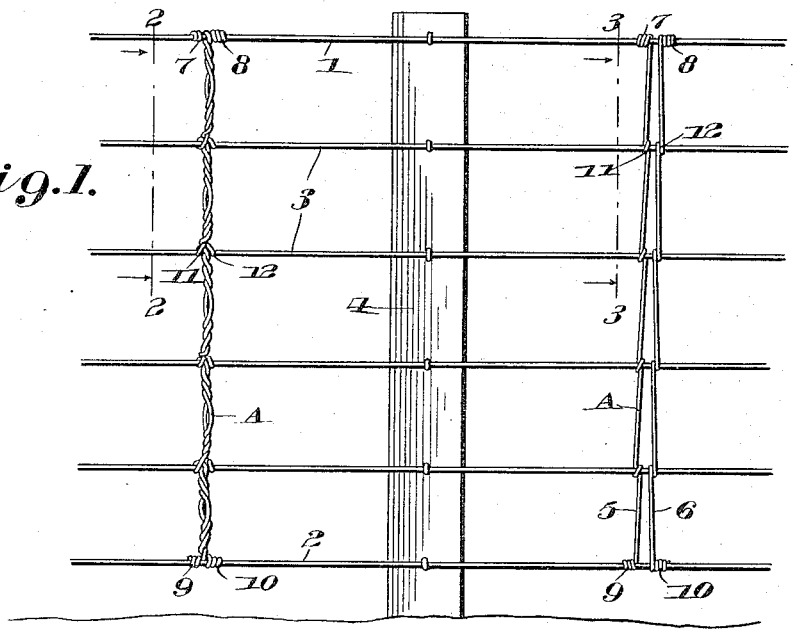
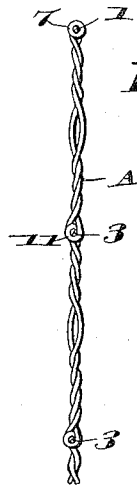
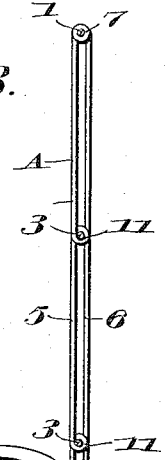
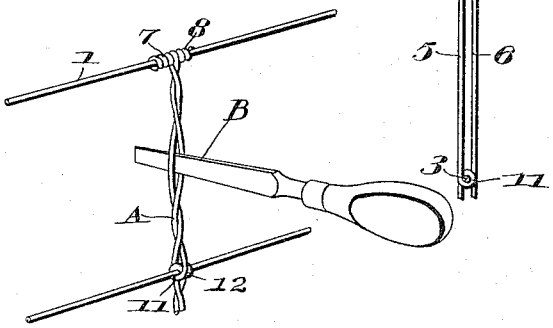
Witnesses
Inventor
Frank Fisher
By Victor J. Evans
Attorney

UNITED STATES PATENT OFFICE.

FRANK FISHER, OF WAYNESVILLE, ILLINOIS.

FENCE.

1,146,857.

Specification of Letters Patent.

Patented July 20, 1915.

Application filed November 22, 1912. Serial No. 732,873.

*To all whom it may concern:*

Be it known that I, FRANK FISHER, a citizen of the United States, residing at Waynesville, in the county of Dewitt and State of Illinois, have invented new and useful Improvements in Fences, of which the following is a specification.

This invention relates to fences, and it has particular reference to wire fences.

The invention has for its object to produce a wire fence, the line wires of which are connected together at intervals by means of stays of simple and improved construction.

A further object of the invention is to simplify and improve the construction of the stays and the application of the same to the fence wires.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing, Figure 1 is a side elevation of a portion of a fence constructed in accordance with the invention, said figure showing also a pair of stay wires previous to twisting the same together. Fig. 2 is a vertical sectional view taken on the line 2—2 in Fig. 1, and showing in elevation one of the completed stays. Fig. 3 is a sectional view taken on the line 3—3 in Fig. 1, and showing in elevation an incompleted stay. Fig. 4 is a perspective view, showing the manner of twisting the stay wires to form a complete stay.

Corresponding parts in the several figures are denoted by like characters of reference.

A portion of a fence is shown, including the horizontal top wire 1, the bottom wire 2 and intermediate line wires 3, 3, all of which are to be stapled upon or otherwise connected with the posts, one of which is shown at 4, said fence wires being suitably spaced apart and stretched to keep them taut.

The fence wires 1, 2, 3 are connected together and spaced apart by means of stays A which are arranged at suitable intervals. Each of the stays is composed of two separate wires 5 and 6 which are positioned adjacent to opposite sides of the fence. The stay wires 5, 6 are each terminally coiled about the top and bottom wires of the fence, and each of the stay wires is coiled once about each of the intermediate fence wires. The top coils 7 and 8, and the bottom coils 9 and 10 of the wires 5 and 6, respectively, extend in opposite directions along the top and bottom wires 1 and 2. The intermediate coils or eyes 11, 12 are formed by winding the wires 5 and 6 about the intermediate wires 3, as shown. After the wires 5 and 6 have been positioned on the fence in the manner shown and described, the stay is completed by twisting together the portions of the stay wires 5 and 6 intermediate the fence wires. This may be accomplished by inserting a key or tool, such as the blade of a screw driver or an ordinary round iron rod or wire, between the portions of the wires 5 and 6 intermediate two proximate fence wires, as shown in Fig. 4, and then twisting the said portions of the stay wires together by rotating the key member B about a vertical axis. The operation is repeated until the portions of the stay wires between the several fence wires have been twisted together, thus completing the stays, as shown in Fig. 1 of the drawing.

In the manner herein described, the stays may be quickly applied to the fence, which latter, by such application will be very materially strengthened and reinforced, the fence wires between the posts being also thereby connected together in such a manner as to prevent cattle and other stock from breaking through the fence. The improved stay is simple in construction and may be readily applied without resorting to skilled labor.

It will be seen that by twisting the portions of the stay wires intermediate the fence wires together in the manner described, each of the said intertwisted portions will be twisted in two directions with respect to the proximate fence wires, thus serving to tighten the stay coils about the fence wires, to draw the fence wires tight and to support said fence wires, as well as the stays, very securely and rigidly.

Having thus described the invention, what is claimed as new, is:—

1. A fence comprising a plurality of horizontal wires, stay wires positioned adjacent to opposite sides of the horizontal wires, the stay wires being coiled oppositely about each of the horizontal wires, and the portions of the stay wires intermediate the horizontal wires being twisted together to tighten the coils about the horizontal wires.

2. The combination with a fence comprising a plurality of horizontal wires, a pair of stay wires positioned adjacent to opposite sides of the fence and terminally coiled in opposite directions about the top and bottom wires, each of said stay wires being also coiled in opposite directions once about each of the intermediate fence wires, and the portions of the stay wires intermediate the fence wires being subsequently twisted together to tighten opposite coils about the fence wires.

3. The combination with a fence including a plurality of horizontal wires, of a stay including two members positioned adjacent to opposite sides of the fence, said members being coiled in opposite directions about each of the horizontal fence wires, and the portions of the stay members intermediate the fence wires being twisted together in opposite directions with respect to the proximate fence wires to tighten the coils about said fence wires.

In testimony whereof I affix my signature in presence of two witnesses.

FRANK FISHER.

Witnesses:
ADOLPH FITSCHEN,
WILLIAM RAMSEY.

Copies of this patent may be obtained for five cents each, by addressing the "Commissioner of Patents, Washington, D. C."